United States Patent
Han

(10) Patent No.: US 11,907,690 B2
(45) Date of Patent: Feb. 20, 2024

(54) ELECTRONIC TERMINAL APPARATUS EQUIPPED WITH THE UI DEVELOPMENT TOOL, WHICH IS ABLE TO PROVIDE AN AUTOMATIC UI COMPONENTS CREATION FUNCTION THROUGH IMAGE ANALYSIS OF A UI DESIGN PLAN, AND THE OPERATING METHOD THEREOF

(71) Applicant: TOBESOFT CO., LTD., Seoul (KR)

(72) Inventor: Jung Hoon Han, Seoul (KR)

(73) Assignee: TOBESOFT CO., LTD., Seoul (KR)

( * ) Notice: Subject to any disclaimer, the term of this patent is extended or adjusted under 35 U.S.C. 154(b) by 0 days.

(21) Appl. No.: 18/123,951

(22) Filed: Mar. 20, 2023

(65) Prior Publication Data

US 2024/0004622 A1   Jan. 4, 2024

(30) Foreign Application Priority Data

May 18, 2022   (KR) .................. 10-2022-0060634

(51) Int. Cl.
| | | |
|---|---|---|
| G06F 8/38 | (2018.01) | |
| G06T 7/194 | (2017.01) | |
| G06V 20/62 | (2022.01) | |
| G06T 7/70 | (2017.01) | |

(52) U.S. Cl.
CPC ............... G06F 8/38 (2013.01); G06T 7/194 (2017.01); G06T 7/70 (2017.01); G06V 20/62 (2022.01)

(58) Field of Classification Search
None
See application file for complete search history.

(56) References Cited

U.S. PATENT DOCUMENTS

| | | | |
|---|---|---|---|
| 10,254,927 B2* | 4/2019 | Missig | G09G 5/14 |
| 10,606,925 B2* | 3/2020 | O'Donovan | G06F 8/38 |
| 2003/0007204 A1* | 1/2003 | Ashizaki | G06F 18/00 359/23 |
| 2010/0002002 A1* | 1/2010 | Lipsky | G06F 18/00 382/164 |
| 2016/0078642 A1* | 3/2016 | Nigg | G06Q 10/0633 345/632 |
| 2018/0203596 A1* | 7/2018 | Dhaliwal | G06F 3/04817 |
| 2019/0094850 A1* | 3/2019 | Li | G08C 17/00 |
| 2021/0158093 A1* | 5/2021 | Kaynig-Fittkau | G06V 10/82 |
| 2022/0092842 A1* | 3/2022 | Levy | G06T 11/60 |
| 2023/0131916 A1* | 4/2023 | Elbaz | G06V 40/168 715/809 |

* cited by examiner

*Primary Examiner* — Toan H Vu
(74) *Attorney, Agent, or Firm* — Park, Kim & Suh, LLC

(57) ABSTRACT

Disclosed are an electronic terminal apparatus and an operating method thereof. The present invention relates to an electronic terminal apparatus equipped with a UI development tool, which is able to provide an automatic UI component creation function through an image analysis of a UI design plan, and an operating method thereof.

11 Claims, 3 Drawing Sheets

ELECTRONIC TERMINAL APPARATUS EQUIPPED WITH THE UI DEVELOPMENT TOOL, WHICH IS ABLE TO PROVIDE AN AUTOMATIC UI COMPONENTS CREATION FUNCTION THROUGH IMAGE ANALYSIS OF A UI DESIGN PLAN, AND THE OPERATING METHOD THEREOF

CROSS-REFERENCE TO RELATED APPLICATIONS

This application claims priority to and the benefit of Korean Patent Application No. 10-2022-0060634 filed in the Korean Intellectual Property Office on May 18, 2022, the entire contents of which are incorporated herein by reference.

TECHNICAL FIELD

The present invention relates to an electronic terminal apparatus equipped with the UI development tool, which is able to provide an automatic UI component creation function through an image analysis of a UI design plan, and an operating method thereof.

BACKGROUND ART

In general, there are many cases in which users who develop UI by utilizing a user interface (UI) development tool, refer to a presentation document writing program or a handwritten UI design plan to develop the UI by a scheme of arranging UI components such as a text input box, a menu window, etc., according to a function to be implemented in the UI.

There are many cases in which the UI components such as the text input box, the menu window, etc., to be included in the UI to be developed are inserted into the UI design plan in a predetermined figure format, and a user who intends to develop the UI by referring to the UI design plan should perform a task of viewing figures inserted into the UI design plan, and appropriately selecting and arranging the UI component corresponding to each figure.

However, when the UI is developed by referring to the UI design plan, there is a problem in that a lot of time and efforts are required for the UI development in that the user should view the figures inserted into the UI design plan, select the UI component corresponding to the figure one by one, and confirm an insertion position of each figure in the UI design plan and also determine a layout position of the corresponding UI component.

If a technology is introduced in which when an automatic UI component creation command is applied while an image for a UI design plan in which a plurality of figures are arranged is input by the user in a UI development tool, a background area having the same size as the image is created, and then the plurality of figures are recognized in the image, and a position into which each of the plurality of figures is inserted in the image is confirmed to automatically insert the UI component corresponding to each figure into a point corresponding to the insertion position of each figure in the background area, the user will be able to more efficiently develop a UI by the UI development tool.

SUMMARY OF THE INVENTION

The present invention has been made in an effort to provide an electronic terminal apparatus equipped with a UI development tool capable of providing an automatic UI component creation function through an image analysis for a user interface (UI) design plan, and an operating method thereof to support a user to more efficiently development a UI by utilizing the UI development tool.

An exemplary embodiment of the present invention provides an electronic terminal apparatus equipped with a UI development tool, which is able to provide an automatic UI component creation function through an image analysis of a UI design plan, which includes: a standard name table holding unit storing and holding a standard name table having two or more predetermined standard names recorded therein, which correspond to a plurality of predetermined UI components, respectively, which is supported in the UI development tool; when an automatic UI component creation command for instructing to automatically create the UI component corresponding to each of a plurality of figures is applied while a first image for a UI design plan in which a plurality of figures, wherein a text for a name of a UI component corresponding to each figure is inserted into each of the plurality of figures, are arranged is input by a first user, an automatic creation event generation unit generating an automatic creation event for automatically creating the UI component corresponding to each of the plurality of figures; a background area creation unit confirming a horizontal length and a vertical length of the first image to create a background area having the same horizontal length and vertical length as the first image when the automatic creation event is generated; a figure recognition unit recognizing the plurality of figures in the first image; a positional information confirmation unit confirming a position into which each of the plurality of figures is inserted in the first image when the plurality of figures are recognized to confirm positional information for each of the plurality of figures; a text recognition unit recognizing a text inserted into each of the plurality of figures based on a predetermined text recognition module; a UI component matching unit matching a UI component having a standard name matched with a text recognized for each figure among the plurality of UI components with each of the plurality of figures by referring to the standard name table to match the UI component corresponding to each of the plurality of figures; and a UI component insertion unit inserting the UI component matched with each figure into a position according to the positional information for each of the plurality of figures in the background area.

Another exemplary embodiment of the present invention provides an operating method of an electronic terminal apparatus equipped with a UI development tool, which is able to provide an automatic UI component creation function through an image analysis of a UI design plan, which includes: storing and holding a standard name table having two or more predetermined standard names recorded therein, which correspond to a plurality of predetermined UI components, respectively, which is supported in the UI development tool; when an automatic UI component creation command for instructing to automatically create the UI component corresponding to each of a plurality of figures is applied while a first image for a UI design plan in which a plurality of figures, wherein a text for a name of a UI component corresponding to each figure is inserted into each of the plurality of figures, are arranged is input by a first user, generating an automatic creation event for automatically creating the UI component corresponding to each of the plurality of figures; confirming a horizontal length and a vertical length of the first image to create a background area having the same horizontal length and vertical length as the first image when the automatic creation event is generated; recognizing the plurality of figures in the first image; confirming a position into which each of the plurality of figures is inserted in the first image when the plurality of figures are recognized to confirm positional information for each of the plurality of figures; recognizing a text inserted into each of the plurality of figures based on a predetermined text recognition module; matching a UI component having a standard name matched with a text recognized for each figure among the plurality of UI components with each of the plurality of figures by referring to the standard name table to match the UI component corresponding to each of the plurality of figures; and inserting the UI component matched with each figure into a position according to the positional information for each of the plurality of figures in the background area.

According to an exemplary embodiment of the present invention, provided is an electronic terminal apparatus equipped with a UI development tool capable of providing an automatic UI component creation function through an image analysis for a user interface (UI) design plan, and an operating method thereof to support a user to more accurately and efficiently develop a UI by utilizing the UI development tool.

DETAILED DESCRIPTION

Figure 1:
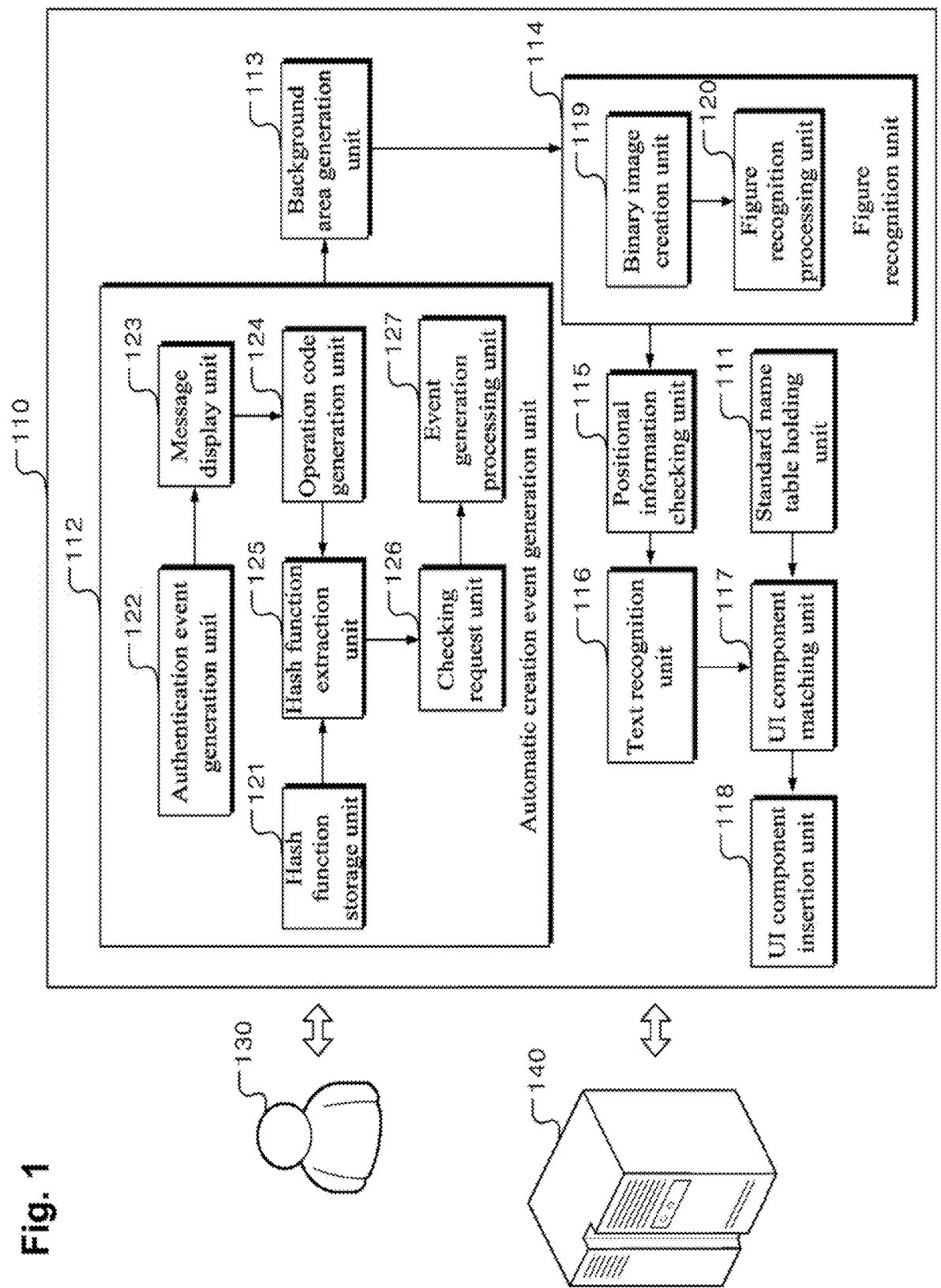
FIG. 1 is a diagram illustrating a structure of an electronic terminal apparatus equipped with a UI development tool capable of providing an automatic UI component creation function through an image analysis for a user interface (UI) design plan according to an exemplary embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In the present invention, unless explicitly described to the contrary, the word "comprise" and variations such as "comprises" or "comprising", will be understood to imply the inclusion of stated elements but not the exclusion of any other elements. In addition, in various exemplary embodiments of the present invention, each component, function blocks, or means may be composed of one or more lower components, and the electric, electronic, and mechanical functions performed by each component may be implemented by known various devices or mechanical elements such as electronic circuits, integrated circuits, ASIC (Application Special Integrated Circuit), and respective devices or elements may be implemented separately or two or more devices or elements may be integrated into one or implemented.

On the other hand, the blocks of the attached block diagrams or steps of flowcharts can be interpreted as meaning computer program instructions that are installed in the processor or memory of the equipment capable of data processing such as general computers, special computers, portable notebook computers, and network computers, and perform designated functions. Since these computer program instructions can be stored in a memory provided in a computer device or a memory readable on a computer device, the functions described in the blocks of the block diagram or the steps of the flowchart may be produced as a manufacturing product that contains the command means to perform the functions. In addition, each block or each step may indicate a part of a module, segment or code comprising one or more executable instructions for executing a specific logical function(s). In addition, some replaceable exemplary embodiments should be noted that the functions mentioned in the blocks or stages are possible, unlike the determined order. For example, the two blocks or steps shown in one subsequently may be performed simultaneously or in reverse order, and in some cases, some blocks or steps may be omitted.

FIG. 1 is a diagram illustrating a structure of an electronic terminal apparatus equipped with a UI development tool capable of providing an automatic UI component creation function through an image analysis for a user interface (UI) design plan according to an exemplary embodiment of the present invention.

Referring to FIG. 1, an electronic terminal apparatus 110 according to an exemplary embodiment of the present invention includes a standard name table holding unit 111, an automatic creation event generation unit 112, a background area creation unit 113, a figure recognition unit 114, a positional information confirmation unit 115, a text recognition unit 116, a UI component matching unit 117, and a UI component insertion unit 118.

The standard name table holding unit 111 which is supported in the UI development tool stores and holds a standard name table having two or more predetermined standard names recorded therein, which correspond to a plurality of predetermined UI components, respectively.

Here, the plurality of UI components mean components which may be created by a user through a UI development tool, such as a button, a text input box, a menu window, etc.

For example, when the plurality of predetermined UI components which are supported in the UI development tool are 'UI component 1, UI component 2, and UI component 3', the standard name table holding unit 111 may store and hold a standard name table having two or more predetermined standard names recorded therein, which correspond to 'UI component 1, UI component 2, and UI component 3', respectively which are shown in Table 1 below.

TABLE 1

| Plurality of UI components | Two or more standard names |
| --- | --- |
| UI component 1 | Standard name 1 |
|  | Standard name 2 |

TABLE 1-continued

| Plurality of UI components | Two or more standard names |
|---|---|
| | Standard name 3 |
| | Standard name 4 |
| UI component 2 | Standard name 5 |
| | Standard name 6 |
| | Standard name 7 |
| UI component 3 | Standard name 8 |
| | Standard name 9 |
| | Standard name 10 |
| | Standard name 11 |

The automatic creation event generation unit 112 generates an automatic creation event for automatically creating a UI component corresponding to each of the plurality of figures when an automatic UI component creation command for instructing to automatically create the UI component corresponding to each of the plurality of figures is applied while a first image for a UI design plan in which the plurality of figures are arranged is input by a first user 130.

Here, the UI design plan may be a document provided in a form of a predetermined electronic document such as a slide document written by a presentation document writing program, or a document by hand by a person. In this case, a designer which writes the UI design plan creates a figure for expressing a predetermined UI component, and then insert the name of the UI component corresponding to each figure inside each figure, and arrange the inserted name in the UI design plan, when writing the UI design plan. As a result, in the present invention, it is assumed that a text for the name of the UI component corresponding to each figure may be inserted into an inside of each of the plurality of figures inserted into the UI design plan.

When the automatic creation event is generated by the automatic creation event generation unit 112, the background area creation unit 113 confirms a horizontal length and a vertical length of the first image to create a background area having the same horizontal length and vertical length as the first image.

The figure recognition unit 114 recognizes the plurality of figures in the first image.

In this case, according to an exemplary embodiment of the present invention, the figure recognition unit 114 as a specific component for recognizing the plurality of figures in the first image may include a binary image creation unit 119 and a figure recognition processing unit 120.

The binary image creation unit 119 changes a pixel value of each of first pixels having a pixel value which belongs to a predetermined pixel value range as a color configuring a line of the figure among the plurality of pixels constituting the first image to a predetermined first pixel value, and changes a pixel value of each of remaining second pixels other than the first pixels to a predetermined second pixel value to create a binary image among the plurality of pixels.

The figure recognition processing unit 120 separates and recognizes only the first pixels having the first pixel value in the binary image to recognize the plurality of figures constituted by the first pixels.

Figure 2:
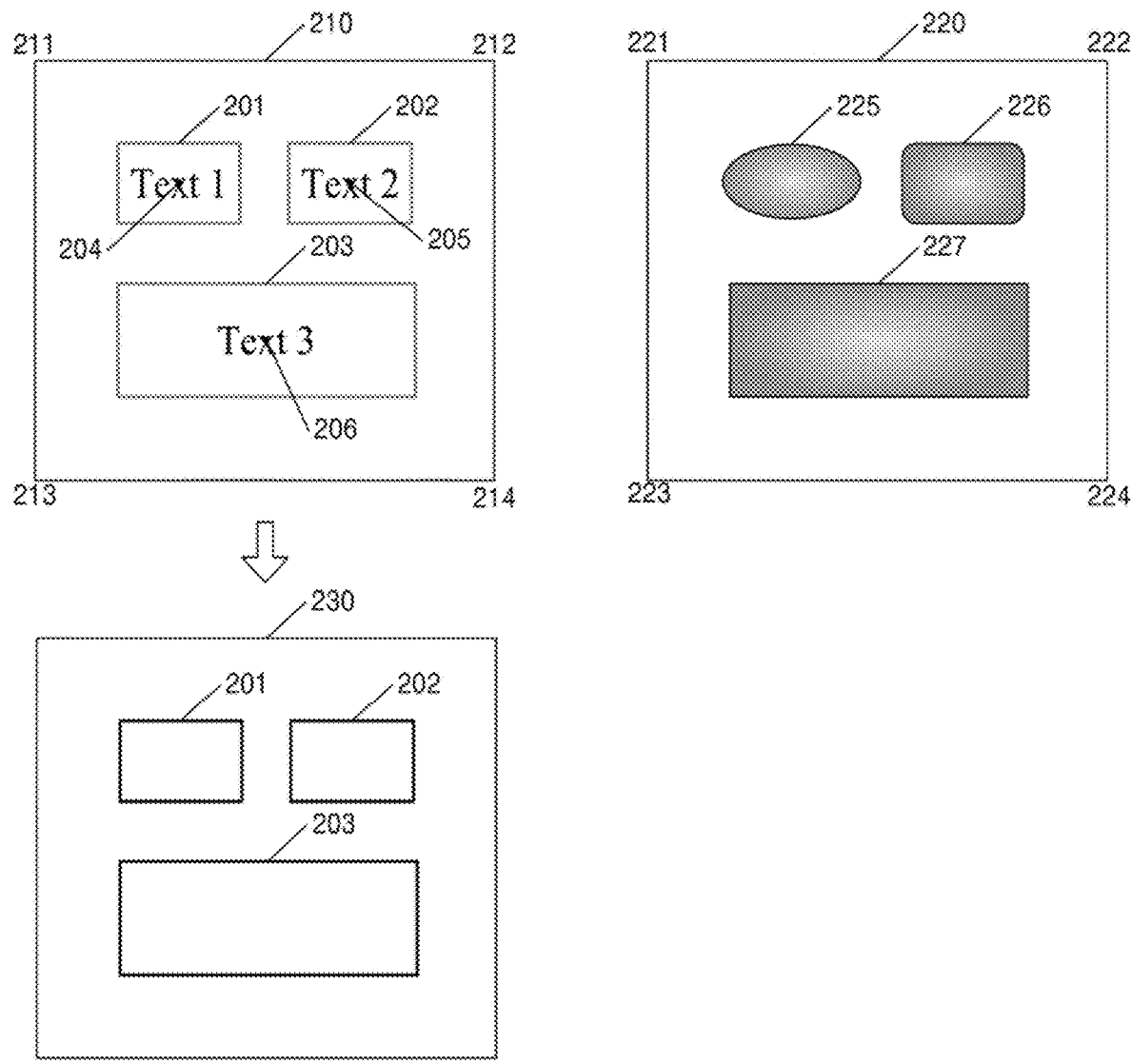
FIG. 2 is a diagram for describing an operation of the electronic terminal apparatus equipped with a UI development tool capable of providing an automatic UI component creation function through an image analysis for a user interface (UI) design plan according to an exemplary embodiment of the present invention.

Hereinafter, referring to FIG. 2, operations of the automatic creation event generation unit 112, the background area creation unit 113, and the figure recognition unit 114 will be described in detail, for example.

First, it is assumed that the automatic UI component creation command for instructing to automatically create a UI component corresponding to each of a plurality of rectangles 201, 202, and 203 is applied while 'image 1 210' for a UI design plan in which the plurality of rectangles 201, 202, and 203 are arranged is input into the electronic terminal apparatus 110 by 'user 1130'.

In this case, the automatic creation event generation unit 112 may generate the automatic creation event for automatically creating the UI component corresponding to each of the plurality of rectangles 201, 202, and 203.

Then, the background area creation unit 113 confirms a horizontal length and a vertical length of 'image 1 210' to create a background area 220 having the same horizontal length and vertical length as 'image 1 210'.

In this case, it is assumed that the predetermined pixel value range as the color configuring the line of the figure is 'more than 150 and 255 or less', the predetermined first pixel value is '255', and the predetermined second pixel value is '0'.

Then, the binary image creation unit 119 may change the pixel value of each of the first pixels having the pixel value which belongs to the predetermined pixel value range as the color configuring the line of the figure among the plurality of pixels constituting 'image 1 210' to '255 which is the first pixel value, and changes the pixel value of remaining second pixels other than the first pixels among the plurality of pixels to '0' which is the second pixel value to create a binary image 230.

Then, the figure recognition processing unit 120 separates and recognizes only the first pixels having '255' which is the first pixel value in the binary image 230 to recognize the plurality of rectangles 201, 202, and 203 constituted by the first pixels.

When the plurality of figures are recognized by the figure recognition unit 114, the positional information confirmation unit 115 confirms a position into which each of the plurality of figures is inserted in the first image to confirm positional information for each of the plurality of figures.

In this case, according to an exemplary embodiment of the present invention, when the plurality of figures are recognized by the figure recognition unit 114, the positional information confirmation unit 115 may confirm a 2-dimensional relative coordinate for a center point of each of the plurality of figures as the positional information for each of the plurality of figures based on any one first apex among four apexes constituting the first image in the first image.

The text recognition unit 116 recognizes a text inserted into each of the plurality of figures based on a predetermined text recognition module.

Here, the text recognition module means a text recognition module pre-constructed based on optical character recognition (OCR) technology or deep learning technology which may be acquired by the text recognized in an image or a video.

The UI component matching unit 117 matches a UI component having a standard name matched to the text recognized for each figure among the plurality of UI components with each of the plurality of figures by referring to the standard name table to match the UI component corresponding to each of the plurality of figures.

The UI component insertion unit 118 inserts the UI component matched with each figure into the position according to the positional information for each of the plurality of figures in the background area.

In this case, according to an exemplary embodiment of the present invention, the UI component insertion unit 118 may insert the UI component corresponding to each figure into the position according to the 2D relative coordinate constituting the positional information for each of the plurality of figures based on the apex corresponding to the first apex among four apexes constituting the background area in the background area.

Hereinafter, referring to FIG. 2, the operations of the positional information confirmation unit 115, the text recognition unit 116, the UI component matching unit 117, and the UI component insertion unit 118 will be described in detail, for example.

First, as in the above-described example, it is assumed that the plurality of rectangles 201, 202, and 203 are recognized based on the binary image 230 by the figure recognition unit 114.

Then, the positional information confirmation unit 115 may confirm the 2D relative coordinate for the center point of each of the plurality of rectangles 201, 202, and 203 as the positional information for each of the plurality of rectangles 201, 202, and 203 based on any one first apex 213 of four apexes 211, 212, 213, and 214 constituting 'image 1 210' in 'image 1 210'.

In this regard, when 2D relative coordinates for center points 204, 205, and 206 of the plurality of respective rectangles 201, 202, and 203 are '$(x_1, y_1)$, $(x_2, y_2)$, and $(x_3, y_3)$' based on the first apex 213, the positional information confirmation unit 115 may confirm the positional information for the plurality of rectangles 201, 202, and 203 as '$(x_1, y_1)$, $(x_2, y_2)$, and $(x_3, y_3)$', respectively.

Then, the text recognition unit 116 may recognize 'text 1, text 2, and text 3' which are texts inserted into the plurality of rectangles 201. 202, and 203, respectively based on a predetermined text recognition module.

Then, the UI component matching unit 117 matches the UI component having the standard name matched with the text recognized for each figure among 'UI component 1, UI component 2, and UI component 3' which are the plurality of UI components with each of the plurality of rectangles 201, 202, and 203 by referring to the standard name table shown in Table 1 above to match the UI components corresponding to the plurality of rectangles 201, 202, and 203, respectively.

In this regard, it is assumed that the standard name matched with 'text 1' which is the text recognized for the rectangle 201 is 'standard name 5', the standard name matched with 'text 2', which is the text recognized for the rectangle 202 is 'standard name 9', and the standard name matched with 'text 3' which is the text recognized for the rectangle 203 is 'standard name 2'.

In this case, in the standard name table shown in Table 1, since the UI components having 'standard name 5, standard name 9, and standard name 2' as the standard names, respectively are 'UI component 2, UI component 3, and UI component 1', the UI component matching unit 117 may match the UI components corresponding to the plurality of rectangles 201, 202, and 203, respectively with 'UI component 2, UI component 3, and UI component 1'.

Then, the UI component insertion unit 118 may insert UI components 225, 226, and 227 corresponding to respective figures into the positions according to the 2D relative coordinates constituting the positional information for the plurality of respective rectangles 201, 202, and 203 based on the apex 223 corresponding to the first apex 213 among four apexes 221, 222, 223, and 224 constituting the background area 220 in the background area 220.

In this regard, since the 2D relative coordinates constituting the positional information for the plurality of respective rectangles 201, 202, and 203 are $(x_1, y_1)$, $(x_2, y_2)$, and $(x_3, y_3)$', the UI component insertion unit 118 may insert 'UI component 2 225' which is a UI component corresponding to the rectangle 201 into the position according to '$(x_1, y_1)$' based on the apex 223, insert 'UI component 3 226' which is a UI component corresponding to the rectangle 202 into the position according to '$(x_2, y_2)$' based on the apex 223, and insert 'UI component 1 227' which is a UI component corresponding to the rectangle 203 into the position according to '$(x_3, y_3)$' based on the apex 223, in a figure illustrated in reference numeral 220.

According to an exemplary embodiment of the present invention, the electronic terminal apparatus 110 may further include a component that may allow only a predetermined paying user to use the automatic UI creation function in the UI development tool.

In this regard, the automatic creation event generation unit 112 as a component for confirming whether a first user 130 is a paying user who may use the automatic UI component creation function before generating the automatic creation event may include a hash function storage unit 121, an authentication event generation unit 122, a message display unit 123, an operation code generation unit 124, a hash function extraction unit 125, a confirmation request unit 126, and an event generation processing unit 127.

The hash function storage unit 121 stores p (p is an even number of 2 or more)+1 different hash functions (different unique numbers constituted by integers of 0 to p are allocated to the p+1 hash functions, respectively), which are pre-shared with the predetermined user authentication server 140.

Here, the user authentication server 140 includes a user database storing identification codes of a plurality of respective paying users pre-designated as the paying user who are capable of using the automatic UI component creation function in the UI development tool.

For example, the user authentication server 140 may include a user database shown in Table 2 below.

TABLE 2

| Plurality of paying users | Identification code |
|---|---|
| User 1 | Identification code 1 |
| User 2 | Identification code 2 |
| User 3 | Identification code 3 |
| User 4 | Identification code 4 |

In such a situation, when p is '6', the hash function storage unit 121 may store '7' different hash functions shown in Table 3 below.

TABLE 3

| Hash functions | Unique number |
|---|---|
| Hash function 1 | 0 |
| Hash function 2 | 1 |
| Hash function 3 | 2 |
| Hash function 4 | 3 |
| Hash function 5 | 4 |
| Hash function 6 | 5 |
| Hash function 7 | 6 |

When the automatic UI component creation command is applied while the first image is input by the first user 130, the authentication event generation unit 122 generates an authentication event for confirming whether the first user 130 is the paying user who is capable of using the automatic UI component creation function before generating the automatic creation event.

The message display unit 123 displays a message including contents for requesting inputting a pre-issued identification code for the first user 130 on a screen when the authentication event is generated by the authentication event generation unit 122.

When the first identification code is input by the first user 130, the operation code creation unit 124 randomly creates a p-digit disposable authentication number, separates the disposable authentication number into a front p/2-digit first part number and a rear p/2-digit second part number based on the central axis, and then performs a modulo-2 operation for each of p/2 numbers constituting the first part number to create a p/2-bit first partial code, and performs the modulo-2 operation for p/2 respective numbers constituting the second part number to create a p/2-bit second partial code, and then performs exclusive OR of first partial code and the second partial code to create a p/2-bit operation code.

Here, the module-2 operation means an operation of calculating a remainder acquired by dividing a predetermined dividend by 2.

The hash function extraction unit 125 computes the sum of Hamming weights for the first partial code and the second partial code, respectively, and then extracts a first hash function in which the sum of the Hamming weights is allocated as a unique number among the p+1 hash functions from the hash function storage unit.

The confirmation request unit 126 creates a first hash value by applying the operation code as an input to the first hash function, encrypts the first identification code into the first hash value, and then transmits a confirmation request command for requesting confirming whether the first user 130 is the paying user who is capable of using the automatic UI component creation function while transmitting the encrypted first identification code and the disposable authentication number to the user authentication server 140.

Hereinafter, the operations of the authentication event generation unit 122, the message display unit 123, the operation code generation unit 124, the hash function extraction unit 125, and the confirmation request unit 126 will be described in detail, for example.

First, as in the above-described example, it is assumed that the automatic UI component creation command is applied while the first image 210 is input into the electronic terminal apparatus 110 by 'user 1 130'.

In this case, the authentication event generation unit 122 may generate the authentication event for confirming whether 'user 1 130' is the paying user who is capable of using the automatic UI component creation function before generating the automatic creation event.

Then, the message display unit 123 may display a message including the contents for requesting inputting the identification code pre-issued for 'user 1 130' on the screen.

In this case, when 'user 1 130' confirms the message to inputs 'identification code 1' which is the identification code pre-issued for 'user 1 130' into the electronic terminal apparatus 110, the operation code creation unit 124 may randomly create a '6'-digit disposable authentication number.

In this case, when the disposable authentication number is created as '921230', the operation code creation unit 124 may separate '921230' which is the disposable authentication number into '921' which is a front '3'-digit first part number and '230' which is a rear '3'-digit second part number based on the central axis.

Then, the operation code creation unit 124 performs the modulo-2 operation for each of '3' numbers constituting '921' which is the first part number to create the '3'-bit first partial code as '101', and performs the modulo-2 operation for each of '3' numbers constituting '230' which is the second part number to create the '3'-bit second partial code as '010'.

Thereafter, the operation code creation unit 124 performs the exclusive OR for '101' which is the first partial code and '010' which is the second partial code to create the '3'-bit operation code as '111'.

Then, the hash function extraction unit 125 may compute the sum of the Hamming weights for '101' which is the first partial code and '010' which is the second partial code as '3', and extract 'hash function 4' in which '3' is allocated as the unique number among '7' hash functions from the hash function storage unit 121 shown in Table 3.

Then, the confirmation request unit 126 may create 'hash value 1' by applying '111' which is the operation code as the input to 'hash function 4', and encrypts 'identification code 1' into 'hash value 1', and then transmit the confirmation request command for requesting confirming whether 'user 1 130' is the paying user who is capable of using the automatic UI component creation function while transmitting the encrypted 'identification code 1' and '921230' which is the disposable authentication number to the user authentication server 140.

In this case, according to an exemplary embodiment of the present invention, the user authentication server 140 may store the p+1 hash functions in the memory, creates the first hash value based on the p+1 hash functions and the disposable authentication number when the confirmation request command is received while the encrypted first identification code and the disposable authentication number are received from the electronic terminal apparatus 110, decodes the encrypted first identification code into the first hash value to restore the first identification code, and then confirms whether the first identification code is stored in the user database, and creates a confirmation message for indicating that it is confirmed that the first user 130 is the paying user who is capable of using the automatic UI component creation function and transmit the confirmation message to the electronic terminal apparatus 110 when it is confirmed that the first identification code is stored in the user database.

In this case, according to an exemplary embodiment of the present invention, the user authentication server 140 stores the p+1 hash functions in the memory, separates the disposable authentication number into the front p/2-digit first part number and the rear p/2-digit second part number based on the central axis when the confirmation request command is received while the encrypted first identification code and the disposable authentication number are received from the electronic terminal apparatus 110, and then performs the modulo-2 operation for each p/2 numbers constituting the first part number to create the first partial code, performs the modulo-2 operation for each of p/2 numbers constituting the second part number to create the second partial code, and then performs the exclusive OR for the first partial code and the second partial code to create the operation code, and computes the sum of the Hamming weights for the first partial code and the second partial code, respectively, and then extract the first hash function in which the sum of the Hamming weights is allocated as the unique number among the p+1 hash functions, creates the first hash value by applying the operation code as the input to the first hash function, and then decodes the encrypted first identification code into the first hash value to restore the first identification code.

As such, as it is confirmed that the first user 130 is the paying user who is capable of using the automatic UI component creation function in the user authentication server 140, when the confirmation message is received from the user authentication server 140, the event generation processing unit 127 generates the automatic creation event.

Hereinafter, the operations of the user authentication server 140 and the event generation processing unit 127 will be described in detail, for example.

First, '7' hash functions shown in Table 3 above may be stored in the memory of the user authentication server 140.

In such a situation, it is assumed that as in the above-described example, as the confirmation request unit 126 transmits the confirmation request command for requesting confirming whether 'user 1 130' is the paying user who is capable of using the automatic UI component creation function while transmitting the encrypted 'identification code 1' and '921230' which is the disposable authentication number to the user authentication server 140, the confirmation request command is received while the encrypted 'identification code 1' and '921230' which is the disposable authentication number are received by the user authentication server 140.

Then, the user authentication server 140 may separate '921230' which is the disposable authentication number into '921' which is the front '3'-digit first part number and '230' which is the rear '3'-digit second part number based on the central axis.

Then, the user authentication server 140 performs the modulo-2 operation for each '3' numbers constituting '921' which is the first part number to create the first partial code as '101' and performs the modulo-2 operation for each of '3' numbers constituting '230' which is the second part number to create the second partial code as '010'.

Thereafter, the user authentication server 140 performs the exclusive OR for '101' which is the first partial code and '010' which is the second partial code to create the '3'-bit operation code as '111', and compute the sum of the Hamming weights for '101' which is the first partial code and '010' which is the second partial code, respectively as '3'.

Then, the user authentication server 140 may extract 'hash function 4' in which '3' is allocated as the unique number among '7' hash functions stored in the memory.

Thereafter, the user authentication server 140 may create 'hash value 1' by applying '111' which is the operation code as the input to 'hash function 4'.

In this case since the encrypted 'identification code 1' is encrypted into 'hash value 1', the user authentication server 140 decodes the encrypted 'identification code 1' into 'hash value 1' to normally restore 'identification code 1'.

Then, the user authentication server 140 confirms whether 'identification code 1' is stored in the user database shown in Table 2 above to confirm that 'identification code 1' is stored in the user database shown in Table 2 above.

Then, the user authentication server 140 may create a confirmation message indicating that it is confirmed that 'user 1 130' is the paying user who is capable of using the automatic UI component creation function and transmit the confirmation message to the electronic terminal apparatus 110.

As a result, when the electronic terminal apparatus 110 receives the confirmation message from the user authentication server 140, the event generation processing unit 127 may generate the automatic creation event.

Then, the electronic terminal apparatus 110 may perform a process for automatically creating the UI components corresponding to the plurality of rectangles 201, 202, and 203, respectively.

Figure 3:
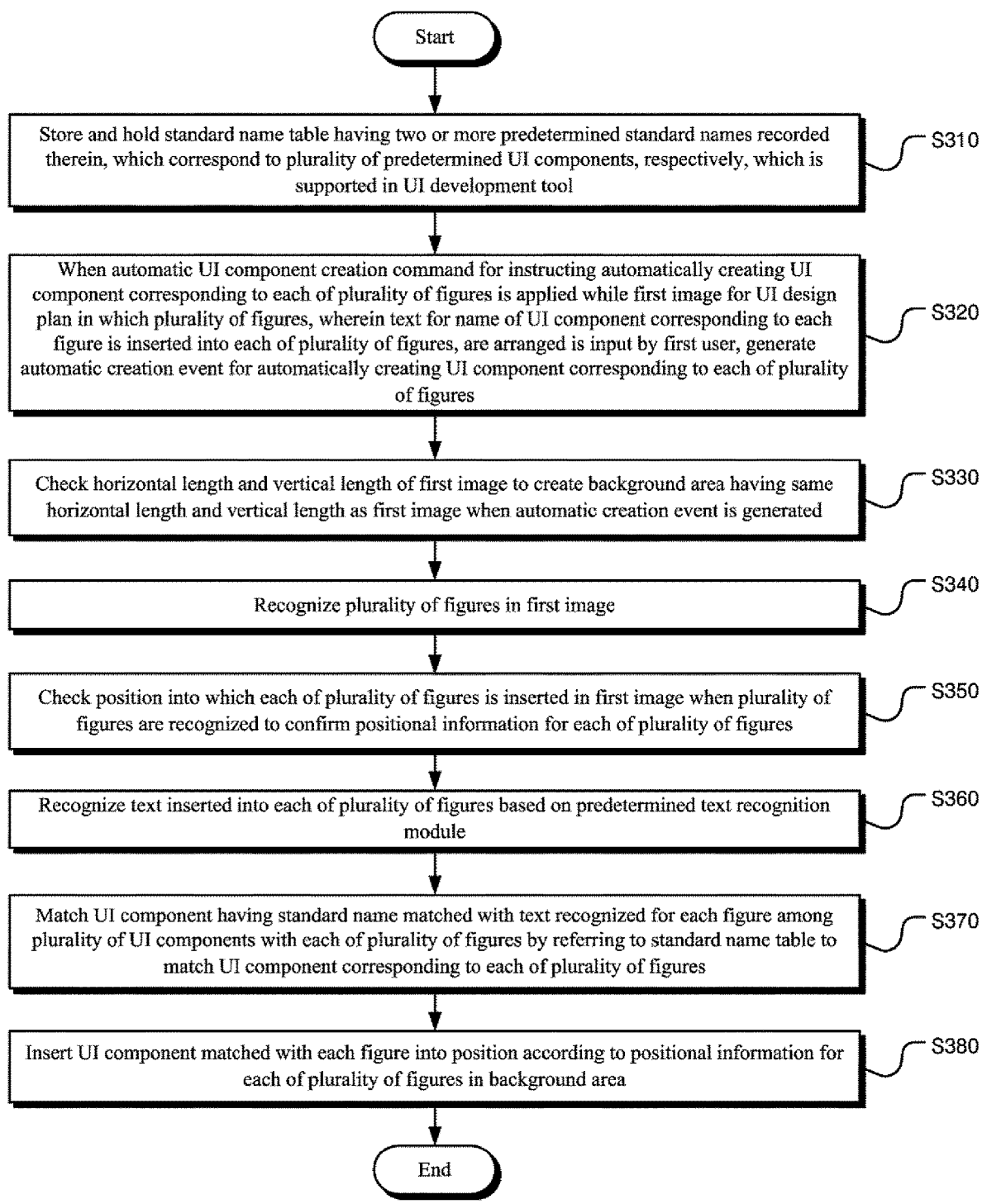
FIG. 3 is a flowchart illustrating an operating method of the electronic terminal apparatus equipped with a UI development tool capable of providing an automatic UI component creation function through an image analysis for a user interface (UI) design plan according to an exemplary embodiment of the present invention.

FIG. 3 is a flowchart illustrating an operating method of the electronic terminal apparatus equipped with a UI development tool capable of providing an automatic UI component creation function through an image analysis for a user interface (UI) design plan according to an exemplary embodiment of the present invention.

In step S310 which is supported in the UI development tool, a standard name table having two or more predetermined standard names recorded therein is stored and held, which correspond to a plurality of predetermined UI component, respectively.

In step S320, when an automatic UI component creation command for instructing to automatically create the UI component corresponding to each of the plurality of figures is applied while a first image for a UI design plan in which a plurality of figures (a text for a name of a UI component corresponding to each figure is inserted into each of the plurality of figures) are arranged is input by a first user, an automatic creation event for automatically creating the UI component corresponding to each of the plurality of figures is generated.

In step S330, when the automatic creation event is generated, a horizontal length and a vertical length of the first image are confirmed to create a background area having the same horizontal length and vertical length as the first image.

In step S340, the plurality of figures are recognized in the first image.

In step S350, when the plurality of figures are recognized, a position into which each of the plurality of figures is inserted in the first image is confirmed to confirm positional information for each of the plurality of figures.

In step S360, the text inserted into each of the plurality of figures is recognized based on a predetermined text recognition module.

In step S370, a UI component having a standard name matched with the text recognized for each figure among the plurality of UI components is matched with each of the plurality of figures by referring to the standard name table to match the UI component corresponding to each of the plurality of figures.

In step S380, the UI component matched with each figure is inserted into a position according to the positional information for each of the plurality of figures in the background area.

In this case, according to an exemplary embodiment of the present invention, step S340 may include changing a pixel value of each of first pixels having a pixel value which belongs to a predetermined pixel value range as a color configuring a line of the figure among the plurality of pixels constituting the first image to a predetermined first pixel value, and changing a pixel value of each of remaining second pixels other than the first pixels to a predetermined second pixel value among the plurality of pixels to create a binary image, and separating and recognizing only the first pixels having the first pixel value from the binary image to recognize the plurality of figures constituted by the first pixels.

In addition, according to an exemplary embodiment of the present invention, in step S350, when the plurality of figures are recognized, a 2-dimensional relative coordinate for a center point of each of the plurality of figures may be confirmed as the positional information for each of the plurality of figures based on any one first apex among four apexes constituting the first image in the first image.

In this case, in step S380, the UI component corresponding to each figure may be inserted into the position according to the 2D relative coordinate constituting the positional information for each of the plurality of figures based on the apex corresponding to the first apex among four apexes constituting the background area in the background area.

According to an exemplary embodiment of the present invention, step S320 may include holding a hash function storage unit storing p (p is an even number of 2 or more+1 different hash functions (different unique numbers constituted by integers of 0 to p are allocated to the p+1 hash functions, respectively), which are pre-shared with a predetermined user authentication server, wherein the user authentication server which is pre-designated as a paying user who is capable of using the automatic UI component creation function in the UI development tool, includes a user database storing an identification code of each of a plurality of paying users, when the automatic UI component creation command is applied while the first image is input by the first user, generating an authentication event for confirming whether the first user is the paying user who is capable of using the automatic UI component creation function before generating the automatic creation event, displaying a message including the contents for requesting inputting the identification code pre-issued for the first user on the screen when the authentication event is generated, when the first identification code is input by the first user, randomly creating a p-digit disposable authentication number, separating the disposable authentication number into a front p/2-digit first part number and a rear p/2-digit second part number based on the central axis, and then performing a modulo-2 operation for each of p/2 numbers constituting the first part number to create a p/2-bit first partial code, and performing the modulo-2 operation for p/2 respective numbers constituting the second part number to create a p/2-bit second partial code, and then performing exclusive OR of the first partial code and the second partial code to create a p/2-bit operation code, computing the sum of the Hamming weights for the first partial code and the second partial code, and then extracting a first hash function in which the sum of the Hamming weights is allocated as the unique number among the p+1 hash functions from the hash function storage unit, creating a first hash value by applying the operation code as an input to the first hash function, encrypts the first identification code into the first hash value, and then transmitting a confirmation request command for requesting confirming whether the first user is the paying user who is capable of using the automatic UI component creation function while transmitting the encrypted first identification code and the disposable authentication number to the user authentication server, and generating the automatic creation event when a confirmation message indicating that it is confirmed that the first user is the paying user who is capable of using the automatic UI component creation function is received from the user authentication server as it is confirmed that the first user is the paying user capable of using the automatic UI component creation function by the user authentication server.

In this case, the user authentication server may store the p+1 hash functions in the memory, create the first hash value based on the p+1 hash functions and the disposable authentication number when the confirmation request command is received while the encrypted first identification code and the disposable authentication number are received from the electronic terminal apparatus, decode the encrypted first identification code into the first hash value to restore the first identification code, and then confirm whether the first identification code is stored in the user database, and create a confirmation message and transmit the confirmation message to the electronic terminal apparatus when it is confirmed that the first identification code is stored in the user database.

In this case, according to an exemplary embodiment of the present invention, the user authentication server may store the p+1 hash functions in the memory, separate the disposable authentication number into the front p/2-digit first part number and the rear p/2-digit second part number based on the central axis when the confirmation request command is received while the encrypted first identification code and the disposable authentication number are received from the electronic terminal apparatus, and then perform the modulo-2 operation for each p/2 numbers constituting the first part number to create the first partial code, perform the modulo-2 operation for each of p/2 numbers constituting the second part number to create the second partial code, and then perform the exclusive OR for the first partial code and the second partial code to create the operation code, and compute the sum of the Hamming weights for the first partial code and the second partial code, respectively, and then extract the first hash function in which the sum of the Hamming weights is allocated as the unique number among the p+1 hash functions, create the first hash value by applying the operation code as the input to the first hash function, and then decode the encrypted first identification code into the first hash value to restore the first identification code.

Hereinabove, the operating method of the electronic terminal apparatus equipped with a UI development tool capable of providing an automatic UI component creation function through an image analysis for a user interface (UI) design plan according to an exemplary embodiment of the present invention has been described with reference to FIG. 3. Herein, since the operating method of the electronic terminal apparatus according to an exemplary embodiment of the present invention may correspond to a configuration for an operation of the electronic terminal apparatus 110, which is described by using FIGS. 1 and 2, a more detailed description thereof will be omitted.

The operating method of the electronic terminal apparatus according to an exemplary embodiment of the present invention may be implemented by a computer program stored in a storage medium for executing the computer program through coupling with a computer.

Meanwhile, the operating method of the electronic terminal apparatus according to an exemplary embodiment of the present invention is implemented in a form of a program command which may be performed through various computer means and may be recorded in the computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. An electronic terminal apparatus equipped with a UI development tool, which is able to provide an automatic UI component creation function through an image analysis of a UI design plan, comprising:

a standard name table holding unit storing and holding a standard name table having two or more predetermined standard names recorded therein, which correspond to a plurality of predetermined UI components, respectively, which is supported in the UI development tool;

an automatic creation event generation unit generating an automatic creation event for automatically creating the UI component corresponding to each of the plurality of figures when an automatic UI component creation command for instructing to automatically create the UI component corresponding to each of a plurality of figures is applied while a first image for a UI design plan in which a plurality of figures, wherein a text for a name of a UI component corresponding to each figure is inserted into each of the plurality of figures, are arranged is input by a first user;

a background area creation unit confirming a horizontal length and a vertical length of the first image to create a background area having the same horizontal length and vertical length as the first image when the automatic creation event is generated;

a figure recognition unit recognizing the plurality of figures in the first image;

a positional information confirmation unit confirming a position into which each of the plurality of figures is inserted in the first image when the plurality of figures are recognized to confirm positional information for each of the plurality of figures;

a text recognition unit recognizing a text inserted into each of the plurality of figures based on a predetermined text recognition module;

a UI component matching unit matching a UI component having a standard name matched with a text recognized for each figure among the plurality of UI components with each of the plurality of figures by referring to the standard name table to match the UI component corresponding to each of the plurality of figures; and a UI component insertion unit inserting the UI component matched with each figure into a position according to the positional information for each of the plurality of figures in the background area.

2. The electronic terminal apparatus of claim 1, wherein the figure recognition unit includes a binary image creation unit changing a pixel value of each of first pixels having a pixel value which belongs to a predetermined pixel value range as a color configuring a line of the figure among the plurality of pixels constituting the first image to a predetermined first pixel value, and changing a pixel value of each of remaining second pixels other than the first pixels to a predetermined second pixel value to create a binary image among the plurality of pixels, and a figure recognition processing unit separating and recognizing only the first pixels having the first pixel value in the binary image to recognize the plurality of figures constituted by the first pixels.

3. The electronic terminal apparatus of claim 1, wherein when the plurality of figures are recognized, the positional information confirmation unit confirms a 2-dimensional relative coordinate for a center point of each of the plurality of figures as the positional information for each of the plurality of figures based on any one first apex among four apexes constituting the first image in the first image, and the UI component insertion unit inserts the UI component corresponding to each figure into the position according to the 2D relative coordinate constituting the positional information for each of the plurality of figures based on the apex corresponding to the first apex among four apexes constituting the background area in the background area.

4. The electronic terminal apparatus of claim 1, wherein the automatic creation event generation unit includes a hash function storage unit storing p (p is an even number of 2 or more)+1 different hash functions (different unique numbers constituted by integers of 0 to p are allocated to the p+1 hash functions, respectively), which are pre-shared with a predetermined user authentication server, wherein the user authentication server which is pre-designated as a paying user who is capable of using the automatic UI component creation function in the UI development tool, includes a user database storing an identification code of each of a plurality of paying users, an authentication event generation unit generating an authentication event for confirming whether the first user is the paying user who is capable of using the automatic UI component creation function before generating the automatic creation event when the automatic UI component creation command is applied while the first image is input by the first user, a message display unit displaying a message including the contents for requesting inputting the identification code pre-issued for the first user on the screen when the authentication event is generated, when the first identification code is input by the first user, an operation code creation unit randomly creating a p-digit disposable authentication number, separating the disposable authentication number into a front p/2-digit first part number and a rear p/2-digit second part number based on the central axis, and then performing a modulo-2 operation for each of p/2 numbers constituting the first part number to create a p/2-bit first partial code, and performing the modulo-2 operation for p/2 respective numbers constituting the second part number to create a p/2-bit second partial code, and then performing exclusive OR of the first partial code and the second partial code to create a p/2-bit operation code, a hash function extraction unit computing the sum of the Hamming weights for the first partial code and the second partial code, and then extracting a first hash function in which the sum of the Hamming weights is allocated as the unique number among the p+1 hash functions from the hash function storage unit, a confirmation request unit creating a first hash value by applying the operation code as an input to the first hash function, encrypts the first identification code into the first hash value, and then transmitting a confirmation request command for requesting confirming whether the first user is the paying user who is capable of using the automatic UI component creation function while transmitting the encrypted first identification code and the disposable authentication number to the user authentication server, and an event generation processing unit generating the automatic creation event when a confirmation message indicating that it is confirmed that the first user is the paying user who is capable of using the automatic UI component creation function is received from the user authentication server as it is confirmed that the first user is the paying user capable of using the automatic UI component creation function by the user authentication server, wherein the user authentication server stores the p+1 hash functions in the memory, creates the first hash value based on the p+1 hash functions and the disposable authentication number when the confirmation request command is received while the encrypted first identification code and the disposable authentication number are received from the electronic terminal apparatus, decodes the encrypted first identification code into the first hash value to restore the first identification code, and then confirms whether the first identification code is stored in the user database, and creates a confirmation message and transmit the confirmation message to the electronic terminal apparatus when it is confirmed that the first identification code is stored in the user database.

5. The electronic terminal apparatus of claim 4, wherein the user authentication server stores the p+1 hash functions in the memory, separates the disposable authentication number into the front p/2-digit first part number and the rear p/2-digit second part number based on the central axis when the confirmation request command is received while the encrypted first identification code and the disposable authentication number are received from the electronic terminal apparatus, and then performs the modulo-2 operation for each p/2 numbers constituting the first part number to create the first partial code, performs the modulo-2 operation for each of p/2 numbers constituting the second part number to create the second partial code, and then performs the exclusive OR for the first partial code and the second partial code to create the operation code, and computes the sum of the Hamming weights for the first partial code and the second partial code, respectively, and then extract the first hash function in which the sum of the Hamming weights is allocated as the unique number among the p+1 hash functions, creates the first hash value by applying the operation code as the input to the first hash function, and then decodes the encrypted first identification code into the first hash value to restore the first identification code.

6. An operating method of an electronic terminal apparatus equipped with a UI development tool, which is able to provide an automatic UI component creation function through an image analysis of a UI design plan, comprising:

storing and holding a standard name table having two or more predetermined standard names recorded therein, which correspond to a plurality of predetermined UI components, respectively, which is supported in the UI development tool;

when an automatic UI component creation command for instructing to automatically create the UI component corresponding to each of a plurality of figures is applied while a first image for a UI design plan in which a plurality of figures, wherein a text for a name of a UI component corresponding to each figure is inserted into each of the plurality of figures, are arranged is input by a first user, generating an automatic creation event for automatically creating the UI component corresponding to each of the plurality of figures;

confirming a horizontal length and a vertical length of the first image to create a background area having the same horizontal length and vertical length as the first image when the automatic creation event is generated;

recognizing the plurality of figures in the first image;

confirming a position into which each of the plurality of figures is inserted in the first image when the plurality of figures are recognized to confirm positional information for each of the plurality of figures;

recognizing a text inserted into each of the plurality of figures based on a predetermined text recognition module;

matching a UI component having a standard name matched with a text recognized for each figure among the plurality of UI components with each of the plurality of figures by referring to the standard name table to match the UI component corresponding to each of the plurality of figures; and inserting the UI component matched with each figure into a position according to the positional information for each of the plurality of figures in the background area.

7. The operating method of an electronic terminal apparatus of claim 6, wherein the recognizing of the plurality of figures includes changing a pixel value of each of first pixels having a pixel value which belongs to a predetermined pixel value range as a color configuring a line of the figure among the plurality of pixels constituting the first image to a predetermined first pixel value, and changing a pixel value of each of remaining second pixels other than the first pixels to a predetermined second pixel value to create a binary image among the plurality of pixels, and separating and recognizing only the first pixels having the first pixel value in the binary image to recognize the plurality of figures constituted by the first pixels.

8. The operating method of an electronic terminal apparatus of claim 6, wherein in the confirming, when the plurality of figures are recognized, a 2-dimensional relative coordinate for a center point of each of the plurality of figures is confirmed as the positional information for each of the plurality of figures based on any one first apex among four apexes constituting the first image in the first image, and in the inserting, the UI component corresponding to each figure is inserted into the position according to the 2D relative coordinate constituting the positional information for each of the plurality of figures based on the apex corresponding to the first apex among four apexes constituting the background area in the background area.

9. The operating method of an electronic terminal apparatus of claim 6, wherein the generating of the automatic creation event includes holding a hash function storage unit storing p (p is an even number of 2 or more)+1 different hash functions (different unique numbers constituted by integers of 0 to p are allocated to the p+1 hash functions, respectively), which are pre-shared with a predetermined user authentication server, wherein the user authentication server which is pre-designated as a paying user who is capable of using the automatic UI component creation function in the UI development tool, includes a user database storing an identification code of each of a plurality of paying users, when the automatic UI component creation command is applied while the first image is input by the first user, generating an authentication event for confirming whether the first user is the paying user who is capable of using the automatic UI component creation function before generating the automatic creation event, displaying a message including the contents for requesting inputting the identification code pre-issued for the first user on the screen when the authentication event is generated, when the first identification code is input by the first user, randomly creating a p-digit disposable authentication number, separating the disposable authentication number into a front p/2-digit first part number and a rear p/2-digit second part number based on the central axis, and then performing a modulo-2 operation for each of p/2 numbers constituting the first part number to create a p/2-bit first partial code, and performing the modulo-2 operation for p/2 respective numbers constituting the second part number to create a p/2-bit second partial code, and then performing exclusive OR of the first partial code and the second partial code to create a p/2-bit operation code, computing the sum of the Hamming weights for the first partial code and the second partial code, and then extracting a first hash function in which the sum of the Hamming weights is allocated as the unique number among the p+1 hash functions from the hash function storage unit, creating a first hash value by applying the operation code as an input to the first hash function, encrypts the first identification code into the first hash value, and then transmitting a confirmation request command for requesting confirming whether the first user is the paying user who is capable of using the automatic UI component creation function while transmitting the encrypted first identification code and the disposable authentication number to the user authentication server, and generating the automatic creation event when a confirmation message indicating that it is confirmed that the first user is the paying user who is capable of using the automatic UI component creation function is received from the user authentication server as it is confirmed that the first user is the paying user capable of using the automatic UI component creation function by the user authentication server, wherein the user authentication server stores the p+1 hash functions in the memory, creates the first hash value based on the p+1 hash functions and the disposable authentication number when the confirmation request command is received while the encrypted first identification code and the disposable authentication number are received from the electronic terminal apparatus, decodes the encrypted first identification code into the first hash value to restore the first identification code, and then confirms whether the first identification code is stored in the user database, and creates a confirmation message and transmit the confirmation message to the electronic terminal apparatus when it is confirmed that the first identification code is stored in the user database.

10. The operating method of an electronic terminal apparatus of claim 9, wherein the user authentication server stores the p+1 hash functions in the memory, separates the disposable authentication number into the front p/2-digit first part number and the rear p/2-digit second part number based on the central axis when the confirmation request command is received while the encrypted first identification code and the disposable authentication number are received from the electronic terminal apparatus, and then performs the modulo-2 operation for each p/2 numbers constituting the first part number to create the first partial code, performs the modulo-2 operation for each of p/2 numbers constituting the second part number to create the second partial code, and then performs the exclusive OR for the first partial code and the second partial code to create the operation code, and computes the sum of the Hamming weights for the first partial code and the second partial code, respectively, and then extract the first hash function in which the sum of the Hamming weights is allocated as the unique number among the p+1 hash functions, creates the first hash value by applying the operation code as the input to the first hash function, and then decodes the encrypted first identification code into the first hash value to restore the first identification code.

11. A non-transitory computer readable recording medium having a program recorded therein for allowing a computer to execute an operating method of an electronic terminal apparatus equipped with a UI development tool, which is able to provide an automatic UI component creation function through an image analysis of a UI design plan, comprising:

storing and holding a standard name table having two or more predetermined standard names recorded therein, which correspond to a plurality of predetermined UI components, respectively, which is supported in the UI development tool;

when an automatic UI component creation command for instructing to automatically create the UI component corresponding to each of a plurality of figures is applied while a first image for a UI design plan in which a plurality of figures, wherein a text for a name of a UI component corresponding to each figure is inserted into each of the plurality of figures, are arranged is input by a first user, generating an automatic creation event for automatically creating the UI component corresponding to each of the plurality of figures;

confirming a horizontal length and a vertical length of the first image to create a background area having the same horizontal length and vertical length as the first image when the automatic creation event is generated;

recognizing the plurality of figures in the first image;

confirming a position into which each of the plurality of figures is inserted in the first image when the plurality of figures are recognized to confirm positional information for each of the plurality of figures;

recognizing a text inserted into each of the plurality of figures based on a predetermined text recognition module;

matching a UI component having a standard name matched with a text recognized for each figure among the plurality of UI components with each of the plurality of figures by referring to the standard name table to match the UI component corresponding to each of the plurality of figures; and inserting the UI component matched with each figure into a position according to the positional information for each of the plurality of figures in the background area.

\* \* \* \* \*